July 4, 1950 P. W. THORNHILL 2,513,533
PACKING DEVICE FOR FLUID PRESSURE APPARATUS
Filed Feb. 3, 1947
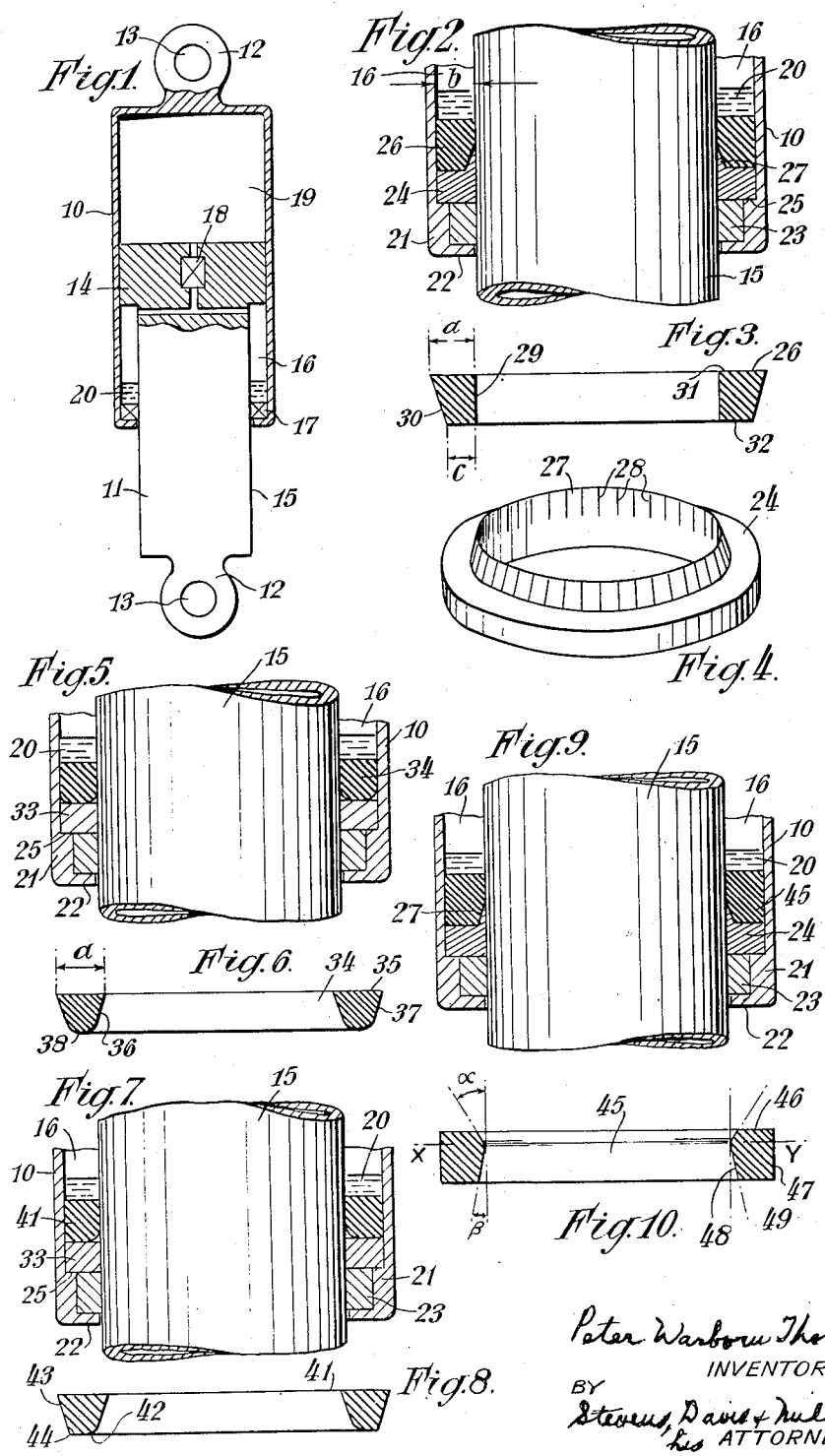

Patented July 4, 1950

2,513,533

UNITED STATES PATENT OFFICE 2,513,533

PACKING DEVICE FOR FLUID PRESSURE APPARATUS

Peter Warborn Thornhill, Leamington Spa, England, assignor to Levitation Limited, and Automotive Products Company Limited, Leamington Spa, England Application February 3, 1947, Serial No. 726,108
In Great Britain December 3, 1945

Section 1, Public Law 690, August 8, 1946
Patent expires December 3, 1965

4 Claims. (Cl. 286—26)

This invention relates to packing devices for fluid pressure apparatus, and has for its object to provide an improved packing device for use between inner and outer tubular members which are movable one relative to the other, to retain liquid under pressure between the two tubular members at one side of the packing device, and permit substantially no leakage of such liquid. In the following description, that side of the packing device subjected to the liquid pressure is termed the high pressure side, and the opposite side is termed the low pressure side.

According to the invention a packing device for fluid pressure apparatus comprises a substantially solid deformable and resilient ring fitting between relatively movable inner and outer telescoping members and engaging with opposed surfaces thereon, the ring being urged by the pressure against an axial abutment on one of said members, and exerting radial pressure on the relatively movable members, which pressure decreases progressively from a point not more than halfway from the high pressure to the low pressure side of the ring towards the said low pressure side.

The ring may be spaced at its low pressure side from the telescoping member relative to which it is movable, and the point of maximum pressure may be at the high pressure side face of the ring.

Further, according to the invention, a packing device for fluid pressure apparatus comprises a substantially solid deformable and resilient ring adapted to fit between inner and outer telescoping members, to engage with opposed surfaces thereon, and to be urged by the pressure against an axial abutment on one of said members, the ring in its free state being tapered in radial thickness from its high pressure to its low pressure side and having a radial thickness at its high pressure side which is greater than the spacing of the telescoping members, and a radial thickness at its low pressure side which is not more than the spacing of said members.

In a packing device according to the last preceding paragraph, the radial thickness of the deformable and resilient ring at its low pressure side is preferably less than the spacing of the telescoping members, and the said low pressure side of the ring may be spaced from the telescoping member relative to which it is movable, by a flexible tapered lip.

The invention is hereinafter described with reference to the accompanying drawings, in which:

Figure 1 is a diagrammatic representation of a pneumatic suspension unit including a packing device according to the invention;

Figure 2 is a partial longitudinal section of a unit such as that shown in Figure 1, showing one form of packing device according to the invention;

Figure 3 shows the deformable and resilient ring used in the packing device of Figure 2, in its initial form;

Figure 4 is a perspective view of the backing ring shown in Figure 2;

Figures 5 and 6 are views similar to Figures 2 and 3 showing an alternative form of packing device;

Figures 7 and 8 are further views similar to Figures 2 and 3 showing another form of packing device; and Figures 9 and 10 are further views, again similar to Figures 2 and 3, and showing another form of packing device.

Referring to Figure 1, the pneumatic suspension unit comprises relatively movable outer and inner telescoping members constituted by a cylinder 10 and plunger 11 each provided with a lug 12 having a hole 13 therein to receive a pin upon which the unit is pivotally mounted. The plunger 11 has an enlarged head which is a substantially fluid-tight fit in the cylinder, and a stem 15 of smaller diameter projecting through the open end of the cylinder. There is thus formed an annular space 16 between the cylinder 10 and the plunger stem 15, this space being closed at its upper end by the plunger head 14, and at its lower end by a packing device shown diagrammatically at 17, the packing device being carried in the cylinder and sliding on the surface of the plunger stem. A valve of any convenient type, indicated diagrammatically at 18, controls the passage of air between the annular space 16, and the space 19 above the plunger head, to give the required damping action. A small quantity of liquid lubricant, indicated at 20, fills the space immediately above the sealing means, thus ensuring that the packing means is kept lubricated.

Figure 2 shows, in section, the lower part of the cylinder 10 and a part of the plunger stem 15, one form of packing device according to the invention being mounted in the cylinder. The cylinder wall is thickened internally at 21 for a short distance from the end, and at its extreme end is an internal flange 22, leaving an opening through which the plunger stem 15 passes freely. A wiper ring 23 is supported in the angle between the thickened part 21 of the cylinder wall, and the flange 22, and is retained in position by a ring 24 engaging the shoulder 25 at the end of the thickened portion. The ring 24, which may be made of metal, but is conveniently formed of a synthetic resinous moulding product, forms a backing for a deformable and resilient ring 26. The backing ring as shown more clearly in Figure 4, has a main portion of substantially rectangular cross section, the radial width of which is such that it substantially fills the space between the cylinder 10 and plunger stem 15, and a tapered lip 27 extending in an axial direction from its inner diameter, the internal surface of the lip being cylindrical and continuous with the inner wall of the main portion, whilst its outer surface is tapered externally so that the lip terminates in a sharp edge. It is essential that the lip 27 should have a high degree of flexibility, and, to assist in this respect, it is divided by slits or sawcuts 28 into a number of sections each of short length in a circumferential direction.

The deformable and resilient ring 26, as shown in Figure 3, is initially of longitudinally tapered section, the inner peripheral wall 29 being cylindrical and the outer peripheral wall 30 frustoconical. The ring is assembled in the cylinder with the end face 31 having the greater radial width facing inwardly, so that it forms the high pressure face. The initial radial width $a$ of this face is greater than the radial width $b$ of the space 16, whilst the initial radial width $c$ of the end face 32 of smaller radial width is less than the radial width $b$ of the space 16.

The ring 26 is assembled with its end face 32 engaging the main body of the backing ring 24, so that the lip 27 lies between its low pressure side and the wall of the plunger stem 15, the lip extending about half-way along the length of the ring 26. Owing to its tapered section the ring 26 exerts a pressure on the plunger tube 15 which is a maximum at the high pressure end face of the ring, and decreases up to the point where the edge of the lip leads the ring 26 away from the plunger tube. As the ring 26 is constantly urged towards the flange 22 by the pressure in the annular space 16, no additional locating means is required to prevent it from moving inwardly.

Figures 5 and 6 show another form of packing device according to the invention in which the lipped backing ring 24 is replaced by a backing ring 33 of plain rectangular section similarly located by the shoulder 25 in the cylinder 10, and serving to position a wiper ring 23. The deformable and resilient ring 34, which is shown in its initial form in Figure 6, has its greatest radial width at the face 35 which forms the high pressure face, being tapered on both its inner and outer peripheral surfaces 36 and 37, both tapered surfaces merging into a rounded part 38 at the low pressure side. The width $a$ of the face 35 is greater than the radial width $b$ of the annular space 16, so that the high pressure side of the ring is compressed on assembly, and the ring exerts a pressure on the plunger tube 15 which is a maximum at the face 35, and decreases towards the rounded end, where there is clearance between the ring and the surface of the plunger tube. It is important that this clearance should be maintained, and this form of packing device cannot therefore be used with pressures high enough to deform the ring 34 to such an extent that it fills up this clearance space. For such high pressure the form of packing device shown in Figures 2 to 4 must be used.

Figures 7 and 8 show a form of packing device similar to that shown in Figures 5 and 6, but in which the deformable and resilient ring 41 is rounded only at the radially inner side of its low pressure face 42, the taper of the outer peripheral face 43 being continued up to the said low pressure face to provide a sharp corner 44. The remaining parts bear the same reference numbers as the corresponding parts in Figure 5.

In the form of packing device shown in Figures 9 and 10 the deformable and resilient ring 45 has its greatest radial width in the plane X—Y, which in the particular example shown is displaced from the high-pressure face 46 of the ring by a distance equal to about one-quarter of the axial thickness of the ring. The plane X—Y may be at any point between the face 46 and the middle of the axial thickness of the ring. As shown, the ring is cylindrical on its outer peripheral surface 47, its inner surface 48 being divergent on both sides of the plane X—Y, and the angle $a$ of the divergence towards the high pressure face 46 being greater than the angle $\beta$ of the divergence towards the low pressure face 49. As shown in these figures, the ring is used with a lipped backing ring 24 similar to that illustrated in Figures 2 and 4, but, for low pressures the corner between the faces 48 and 44 of the ring may be rounded off, as in the examples shown in Figures 6 and 8, and a backing ring of plain rectangular section may be used. The outer peripheral surface 47 of the ring 45 may be tapered in both directions from the plane X—Y as well as, or instead of, the inner surface 48 being divergent, and, instead of the inner surface 48 between the plane X—Y and the high pressure face 46 having a straight taper, it may be rounded.

The deformable and resilient ring, instead of being initially formed with its maximum radial width greater than the radial width of the annular space 16, may have its maximum radial width equal to or less than the radial width of the space 16, a spring mounted in the said space acting on the ring in an axial direction to deform it and so expand it radially.

The packing device according to the invention may be applied to fluid pressure apparatus other than shock absorbers being suitable, for example, for liquid pressure motor units of the ram-and-cylinder type. The packing device may be mounted on the ram or plunger, and be slidable on the surface of the cylinder, instead of being mounted in the cylinder as in the above example.

The deformable and resilient ring may be formed wholly of India rubber or a synthetic rubber-like substance, or may be formed mainly of such substance, with a layer of harder and/or more wear resistant material on the side which engages the member relative to which it is movable.

What I claim is:

1. For fluid pressure apparatus comprising inner and outer telescoping members, a packing device for use between said members to retain fluid in the apparatus at high pressure, comprising a one-piece deformable and resilient ring having a face substantially perpendicular to the axis of said ring upon which the pressure in the apparatus acts, an abutment on one of said members which abutment is substantially parallel to said face against which the ring is urged by the pressure on said perpendicular face, and a flexible tapered lip supported by said abutment and projecting between the said ring and the member on which it slides, the said ring, in its free state, having a radial width which decreases uniformly from a maximum in a plane nearer to the face of the ring upon which the pressure acts than to the opposite face thereof, to a minimum at the said latter face, the maximum and minimum radial widths being respectively greater and less than the spacing between the surfaces of the telescoping members between which the ring is mounted.

2. For fluid pressure apparatus comprising inner and outer telescoping members, a packing device for use between said members to retain fluid in the apparatus at high pressure, comprising a deformable and resilient ring having a face substantially perpendicular to the axis of said ring upon which the pressure in the apparatus acts, an axial abutment on one of said members against which the ring is urged by the pressure on said perpendicular face, and a flexible tapered lip supported by said abutment and projecting between the said ring and the member on which it slides, the said ring, in its free state, having a radial width which decreases progressively from a maximum at the face of the ring upon which the pressure acts, to a minimum at the opposite face, the maximum and minimum radial widths being respectively greater and less than the spacing between the surfaces of the telescoping members between which the ring is mounted.

3. For fluid pressure apparatus comprising inner and outer telescoping members, a packing device for use between said members to retain fluid in the apparatus at high pressure, comprising a one-piece deformable and resilient ring having a face substantially perpendicular to the axis of said ring upon which the pressure in the apparatus acts, an abutment on one of said members which abutment is substantially parallel to said face, a backing ring located between said deformable and resilient ring and said abutment, and a flexible tapered lip integral with said backing ring and projecting between the deformable and resilient ring and the member on which it slides, the said ring, in its free state, having a radial width which decreases uniformly from a maximum in a plane nearer to the face of the ring upon which the pressure acts than to the opposite face thereof, to a minimum at the said latter face, the maximum and minimum radial widths being respectively greater and less than the spacing between the surfaces of the telescoping members between which the ring is mounted.

4. For fluid pressure apparatus comprising inner and outer telescoping members, a packing device for use between said members to retain fluid in the apparatus at high pressure, comprising a deformable and resilient ring having a face substantially perpendicular to the axis of said ring upon which the pressure in the apparatus acts, an axial abutment on one of said members, a backing ring located between said deformable and resilient ring and said abutment, and a flexible tapered lip integral with said backing ring and projecting between the deformable and resilient ring and the member on which it slides, the said ring, in its free state, having a radial width which decreases progressively from a maximum at the face of the ring upon which the pressure acts to a minimum at the opposite face, the maximum and minimum radial widths being respectively greater and less than the spacing between the surfaces of the telescoping members between which the ring is mounted.

PETER WARBORN THORNHILL.

REFERENCES CITED

The following references are of record in the file of this patent:

UNITED STATES PATENTS

| Number | Name | Date |
|---|---|---|
| 859,326 | McMullen | July 9, 1907 |
| 1,867,045 | Young et al. | July 12, 1932 |
| 2,208,620 | Baisch | July 23, 1940 |
| 2,309,154 | Adair | Jan. 26, 1943 |
| 2,316,941 | Dodge | Apr. 20, 1943 |
| 2,387,182 | Procter | Oct. 16, 1945 |

FOREIGN PATENTS

| Number | Country | Date |
|---|---|---|
| 518,193 | Great Britain | of 1940 |